A. DRECHSEL

VEHICLE CONTROL SYSTEM 3,232,635

Filed June 18, 1962

INVENTOR.
ARMIN DRECHSEL

BY Dicke + Craig

ATTORNEYS

United States Patent Office 3,232,635
Patented Feb. 1, 1966

3,232,635
VEHICLE CONTROL SYSTEM
Armin Drechsel, Stuttgart, Germany, assignor to Daimler-Benz Aktiengesellschaft, Stuttgart-Unterturkheim, Germany
Filed June 18, 1962, Ser. No. 203,135
Claims priority, application Germany, June 20, 1961, D 36,362
12 Claims. (Cl. 280—112)

The present invention relates to a vehicle, especially to a motor vehicle, provided with a mechanism which utilizes an auxiliary force, itself controlled by a pendulum, for influencing the inclination or tilting of the vehicle body, particularly about the longitudinal axis of the vehicle.

It is possible with such types of mechanisms which act, for example, on the vehicle spring system to counteract, for example, during acceleration the tilting-up or during braking the nose diving or particularly while driving through curves to oppose the undesirable tilting of the vehicle body toward the outside of the curve.

It is proposed in accordance with the present invention to provide a gyrostabilizer which partakes in the swinging movements of the pendulum controlling the auxiliary force. In that manner, there is achieved at the same time with the aid of the gyro-effect a two-fold purpose, namely, on the one hand, the stabilization of the pendulum with respect to undesired swinging movements, and, on the other, the reinforcements of the forces causing the desired pendulum deflection acting on the pendulum. It is additionally proposed in accordance with the present invention for the further reinforcement of the forces acting on the pendulum controlling the tilting or inclination while driving through curves to arrange the pendulum in front of the front axle of the vehicle which represents a measure that is of advantage quite generally for such types of control pendulums. This is so as a point connected with the vehicle body experiences during the transition from straight drive to a curve drive of a constant radius of curvature the greater a lateral acceleration the further this point is removed from the rear axle, quite apart from the fact that the force acting on the pendulum, which is caused by driving through a relatively larger circle, also increases with an increase in the distance from the rear axle.

The gyro-housing may be arranged concentrically to the pendulum axis, however, it is also within the purview and scope of the present invention to suspend the gyro-housing itself in a swinging manner. This entails the further advantage that the mass of the gyroscope inclusive the housing thereof simultaneously acts as pendulum mass. It is thereby quite advantageous in general if not two separate pendulums, namely, the control pendulum mass, properly speaking, and the gyroscope are provided but if both together form a structural unit.

According to a further feature in accordance with the present invention, with a view toward the aforementioned desired effects and with a view toward the elimination of the unfavorable side effects, it is proposed in connection with the location of the gyro-axes with mechanism for influencing the inclination of the vehicle body about the longitudinal axis thereof that the gyroscope which rotates about an axis extending in the vehicle transverse direction and in a direction opposite to the rotation of the vehicle wheels be supported in a housing that is pivotal about the vertical axis against elastic return forces, possible under frictional damping effects.

Accordingly, it is an object of the present invention to provide an anti-tilt control system for vehicles, particularly motor vehicles, which eliminates the shortcomings and drawbacks encountered in the prior art constructions in an effective, simple and reliable manner.

It is another object of the present invention to provide a gyroscopically controlled anti-tilt controlled system for vehicles, particularly such a system as is operatively associated with the spring system of a motor vehicle, which is simple in construction, reliable in operation, may be readily installed into existing spring systems and is relatively inexpensive both as to manufacture and installation.

Still a further object of the present invention resides in the provision of a control system for influencing the tilting of the vehicle body, particularly of a motor vehicle, in which a control member in the form of a pendulum-like element is used to actuate the control system and in which undesirable swinging movements of the pendulum-like control element are effectively stabilized whereas desirable swinging movements thereof corresponding to desired deflections of the pendulum-like element are effectively reinforced.

Still a further object of the present invention resides in the provision of an anti-tilt control system which discriminates against desirable and undesirable swinging movements of the pendulum-like control member by producing a servo-effect, for example, by means of a gyroscope, which seeks to reinforce the desired swinging movements while reducing the undesired swinging movements of the pendulum-like control member.

Another object of the present invention resides in the provision of a control system influencing the tilting of the vehicle body of a motor vehicle which is relatively sensitive notwithstanding the simplicity of its construction.

These and further objects, features and advantages of the present invention will become more obvious from the following description when taken in connection with the accompanying drawing which shows, for purposes of illustration only, one embodiment in accordance with the present invention and wherein FIGURE 1 is a schematic elevational view of a front axle arrangement in a passenger motor vehicle provided with an anti-tilt control system in accordance with the present invention;

Figure 1:
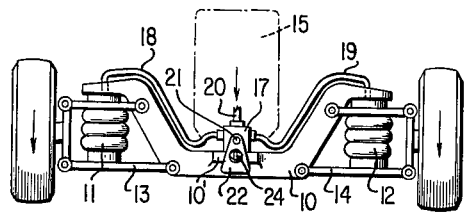
Figure 2:
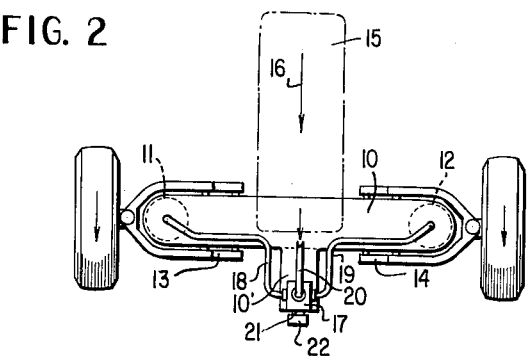
FIGURE 2 is a plan view of the arrangement of FIGURE 1.

Referring now to the drawing wherein like reference numerals are used throughout the various views to designate like parts, and more particularly to FIGURES 1 and 2 thereof, reference numeral 10 designates therein a front axle cross bearer member of any suitable construction from which are suspended the front wheels by means of a conventional double cross guide arm arrangement. The spring support of the wheels is realized by means of spring bellows 11 and 12 which are arranged between the lower guide arms 13 and 14 and the lateral projections of the front axle cross bearer member 10. The engine is schematically indicated in dot and dash line and is designated by reference numeral 15. The arrow 16 indicates the normal driving direction of the vehicle.

A pneumatic, selectively operable shifting apparatus 17 is secured at the forwardly extending projection 10' of the front axle cross bearer member 10. The shifting apparatus 17 which may be of any suitable conventional construction including, for instance, a rotary valve member of conventional design is operatively connected with the inside of the pneumatic spring bellows 11 and 12 through lines 18 and 19. Compressed air is conducted through line 20 from a compressor or compressed air tank to the shifting apparatus 17.

The shifting operations within the shifting apparatus 17 are realized by rotation of a shaft 21 which extends in the vehicle longitudinal direction and is secured to a pendulum 22. Upon deflection of the pendulum 22, for example, toward the right as viewed in the driving direction, as is the case when the vehicle travels through a left curve, the rotary valve mechanism (not shown) within the shifting apparatus 17 is rotated in such a manner that compressed air is conducted from a compressor or tank to the pneumatic spring bellows 11 through line 20, shifting apparatus 17 and line 18 and air is effectively removed or bled from the pneumatic spring bellows 12 through line 19. In this manner, the tendency on the part of the front axle cross bearer member 10 and therewith of the vehicle body connected thereto to tilt toward the outside of the curve is effectively counteracted. As mentioned hereinabove, the shifting apparatus 17 may be of any conventional construction, and since designs for rotary valve mechanisms producing the desired results as described hereinabove are known, per se, in the prior art, a detailed description thereof is dispensed with herein.

Figure 3:
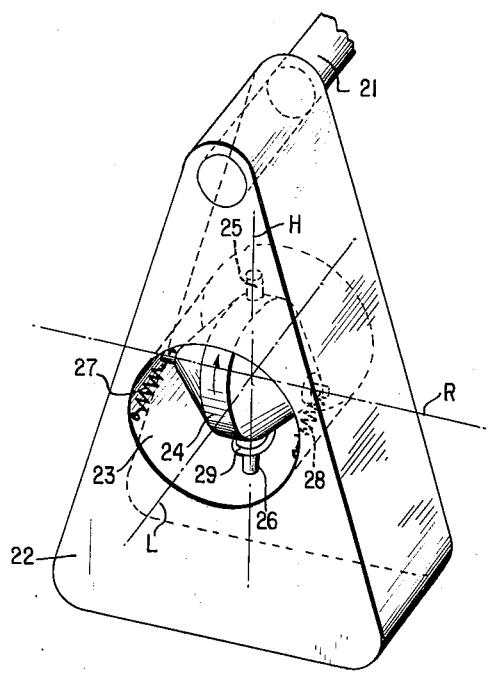
FIGURE 3 is a perspective view, on an enlarged scale, of the pendulum and gyroscope arranged therein of the control system in accordance with the present invention.

The gyroscope 24 is disposed within a cylindrically-shaped aperture 23 of the pendulum 22 (FIGURE 3). The housing of the gyroscope 24 is pivotally supported by means of vertical bearing pins 25 and 26 about the vertical axis H against the return forces of horizontally extending draw-springs 27 and 28 whereby a friction disk 29 is provided in the bottom bearing for purposes of damping. The gyroscope rotor or wheel whose direction of rotation is indicated in FIGURE 3 by the arrow, rotates about the axis R extending in the vehicle transverse direction. The axis extending in the vehicle longitudinal direction which passes through the point of intersection of the axes R and H is designated by reference character L. The electric drive motor for the gyroscope arranged within the gyroscope housing and combined structurally with the gyroscope rotor in any suitable conventional manner as well as the current supply means thereof, all of which are of well-known construction, are omitted in the drawing for the sake of clarity.

To explain the damping function of the gyroscope, it is assumed, for example, that a strong lateral force or shock has been applied from the road surface to the vehicle wheels which would have been continued in the front axle cross bearer member 10. Without the damping effect of the gyroscope, the pendulum 22 by reason of its mass inertia, would have carried out a considerable deflection in the vehicle transverse direction relative to the front axle cross bearer member 10. An undesired shifting operation within the shifting apparatus 17 would have been the consequence of such pendulum deflection. Further shifting operations would have occurred during the return swing into the rest position of the pendulum 22. The gyroscope 24, however, opposes a considerable resistance to these swinging movements. A deflection of the pendulum 22 has the effect on the gyroscope of a rotation about the axis L. However, the gyroscope opposes such a rotation and thereby undergoes a precession movement with a rotation about the axis H against the resistance of springs 27 and 28 and under the damping friction at the friction disk 29.

When driving through curves, the gyroscope 24 aids the deflection of the pendulum toward the outside of the curve. It is thereby assumed that the vehicle drives through a left curve. Such curve drive has the effect on the gyroscope of producing a rotation about the axis H and more particularly in the counterclockwise direction as viewed from above. The gyroscope then performs a precession during the occurrence of such a torque exerted thereon through the springs 27 and 28 by a rotation about the axis L and more particularly in the clockwise direction as viewed from in front. This means in effect that the gyroscope 24 aids the deflection of the pendulum 22 caused by the centrifugal force in the driving direction toward the right.

When the vehicle has driven through a curve and has resumed the straightforward drive, the pendulum 22 is quickly returned to its normal vertical position by the force of gravity, and any tendency to the vehicle to remain in the tilted position will automatically swing the pendulum to the opposite side from that caused by the turn so that if the pressure in the spring system is not automatically equalized by the return of the pendulum to the center position, this swinging of the pendulum to the opposite side will automatically effect a venting of the high pressure bellows and immediately return the spring system to the normal level position.

While I have shown and described one embodiment in accordance with the present invention, it is understood that the same is not limited thereto but is susceptible of many changes and modifications within the spirit and scope thereof, and I therefore do not wish to be limited to the details shown and described herein but intend to cover all such changes and modifications as are encompassed by the scope of the appended claims.

I claim:

1. A vehicle, particularly motor vehicle, having a vehicle body and vehicle wheels supporting said body on front and read axles, comprising an anti-mechanism for selectively influencing the tilting of the vehicle body about a longitudinal axis including pendulum means, gyroscope means and valve means controlled by said pendulum means, means operatively connected with said valve means for selectively controlling the tilting of the vehicle body in response to actuation of said valve means by said pendulum means, said pendulum means being arranged in front of the vehicle front axle said gyroscope means being connected to said pendulum means to effect direct force application therebetween.

2. A vehicle, particularly motor vehicle, having a vehicle body, comprising an anti-tilt mechanism for selectively influencing the tilting of the vehicle body, and means actuated by said anti-tilt mechanism for controlling the tilting of the vehicle body, said anti-tilt mechanism including pendulum-controlled means and gyroscope means pivotally supported within said pendulum-controlled means so as to substantially simultaneously produce the unitary effect upon said valve means in response to change of direction of said vehicle, and said gyroscope means and the mass of said pendulum-controlled means forming an integral unit.

3. A vehicle, particularly motor vehicle, having a vehicle body and vehicle wheels supporting said body on front and rear axles, comprising an anti-tilt mechanism for selectively influencing the tilting of the vehicle body about a longitudinal axis including pendulum means, gyroscope means and valve means controlled by said pendulum means, means operatively connected with said valve means for selectively controlling the tilting of the vehicle body in response to actuation of said valve means by said pendulum means, said pendulum means being arranged in front of the front axle, said gyroscope means having a gyroscope housing swingingly suspended within said pendulum means for effecting coordinate movement therebetween.

4. A vehicle, particularly motor vehicle, having a vehicle body and vehicle wheels supporting said body on front and rear axles, comprising an anti-tilt mechanism for selectively influencing the tilting of the vehicle body about a longitudinal axis including pendulum means, gyroscope means and valve means controlled by said pendulum means, means operatively connected with said valve means for controlling the tilting of the vehicle body in response to actuation of said valve means by said pendulum means, said pendulum means being arranged in front of the front vehicle axle, said gyroscope means having a gyroscope housing swingingly suspended within said pendulum means for effecting coordinate movement therebetween and, said gyroscope means and said pendulum means forming an integral unit.

5. A vehicle, particularly motor vehicle, having a vehicle body and vehicle wheels supporting said body on front and rear axles, comprising an anti-tilt mechanism for selectively influencing the tilting of the vehicle body about a longitudinal axis including pendulum means, gyroscope means and valve means controlled by said pendulum means, said gyroscope means having a gyroscope housing and a gyroscope rotor element rotatably supported in said housing, said rotor element rotating about an axis extending in the vehicle transverse direction and in a direction opposite to the rotation of the vehicle wheels, means pivotally supporting said housing within said pendulum means about a substantially vertical axis and against elastic return forces for effecting coordinate movement therebetween, and means operatively connected with said valve means controlling the tilting of the vehicle body in response to actuation of said valve means by said pendulum means.

6. A vehicle, particularly motor vehicle, having a vehicle body and vehicle wheels supporting said body on front and rear axles, comprising an anti-tilt mechanism for selectively influencing the tilting of the vehicle body about a longitudinal axis including pendulum means, gyroscope means partaking in the swinging movements of said pendulum means and valve means controlled by said pendulum means, said gyroscope means having a gyroscope housing and a gyroscope rotor element rotatably supported in said housing, said rotor element rotating about an axis extending in the vehicle transverse direction and in a direction opposite to the rotation of the vehicle wheels, means pivotally supporting said housing on said pendulum means about a substantially vertical axis and against elastic return forces, friction means frictionally opposing swinging movements of said housing about said substantially vertical axis, and means operatively connected with said valve means for selectively controlling the tilting of the vehicle body in response to actuation of said valve means by said pendulum means.

7. In a motor vehicle having a vehicle body, front and rear axle means adapted to support thereon the vehicle wheels, suspension means for said vehicle wheels including pneumatic spring means for spring supporting said wheels and an anti-tilt control system operatively connected with the spring means of the wheel suspension means and including pressure means and pendulum-like means for selectively rendering said pressure means operable within said anti-tilt control system, the improvement essentially consisting of gyroscope means partaking in the swinging movements of said pendulum-controlled means, said gyroscope means including a housing and rotor means rotating about a vehicle transverse axis in a direction opposite to the direction of rotation of the vehicle wheels when driving in a forward direction, means for supporting said rotor means in said housing about said transverse axis, and further means for supporting said housing about a vertical axis against elastic return forces.

8. A vehicle, particularly motor vehicle, having a vehicle body and vehicle wheels supporting said body on front and rear axles, comprising an anti-tilt mechanism for selectively influencing the tilting of the vehicle body about a longitudinal axis including pendulum means, gyroscope means partaking in the swinging movements of said pendulum means and valve means controlled by said pendulum means, said gyroscope means having a gyroscope housing and a gyroscope rotor element rotatably supported in said housing, said rotor element rotating about an axis extending in the vehicle transverse direction and in a direction opposite to the rotation of the vehicle wheels, means pivotally supporting said housing on said pendulum means about a substantially vertical axis and against elastic return forces, friction means frictionally opposing the swinging movements of said housing about said substantially vertical axis, and means operatively connected with said valve means for selectively effecting said anti-tilt control mechanism in response to actuation of said valve means by said pendulum means, said pendulum means being arranged in front of the front axle, and said gyroscope means and said pendulum means forming an integral unit.

9. In a motor vehicle having a vehicle body, front and rear axle means adapted to support thereon the vehicle wheels, suspension means for said vehicle wheels including pneumatic spring means for spring supporting said wheels and an anti-tilt control system operatively connected with the spring means of the wheel suspension means and including pressure means and pendulum-like means for selectively rendering said pressure means operable within said anti-tilt control system, the improvement essentially consisting of gyroscope means partaking in the swinging movements of said pendulum-controlled means, said gyroscope means including rotor means rotating about a vehicle transverse axis in a direction opposite to the direction of rotation of the vehicle wheels when driving in a forward direction, means for supporting said rotor means in said housing about said transverse axis, and further means for supporting said housing about a vertical axis against elastic return forces including friction means frictionally damping the swinging movements of said housing about said vertical axis.

10. A vehicle, particularly motor vehicle, having a vehicle body, comprising an anti-tilt mechanism for selectively influencing the tilting of the vehicle body, and means actuated by said anti-tilt mechanism for controlling the tilting of the vehicle body, said anti-tilt mechanism including pendulum-controlled means and gyroscope means coupled to said pendulum-controlled means for coordinate movement therewith so as to provide a coordinated control of said anti-tilt mechanism with said pendulum-controlled means, and said gyroscope means and the mass of said pendulum-controlled means forming an integral unit.

11. A vehicle, particularly motor vehicle, having a vehicle body and vehicle wheels supporting said body on front and rear axles, comprising an anti-tilt mechanism for selectively influencing the tilting of the vehicle body about a longitudinal axis including pendulum means, gyroscope means and valve means controlled by said pendulum means, means operatively connected with said valve means for selectively controlling the tilting of the vehicle body in response to actuation of said valve means by said pendulum means, said pendulum means being arranged in front of the vehicle front axle, and, said gyroscope means having a gyroscope housing connected to said pendulum means to effect direct force application therebetween.

12. A vehicle, particularly motor vehicle, having a vehicle body and vehicle wheels supporting said body on front and rear axles, comprising an anti-tilt mechanism for selectively influencing the tilting of the vehicle body about a longitudinal axis including pendulum means, gyroscope means and valve means controlled by said pendulum means, means operatively connected with said valve means for controlling the tilting of the vehicle body in response to actuation of said valve means by said pendulum means, said pendulum means being arranged in front of the front vehicle axle and said gyroscope means having a gyroscope housing connected to said pendulum means to effect direct force application therebetween, and said gyroscope means and said pendulum means forming an integral unit.

References Cited by the Examiner

UNITED STATES PATENTS

| | | | |
|---|---|---|---|
| 1,936,518 | 11/1933 | McColm | 280—6 X |
| 2,048,866 | 7/1936 | Hunt | 280—112 X |
| 2,086,916 | 7/1937 | Kormann | 280—6 X |
| 2,211,784 | 8/1940 | Kretzschmar | 137—45 |
| 2,293,889 | 8/1942 | De Florez | 137—45 X |
| 2,568,402 | 9/1951 | Lynn | 280—6.1 X |
| 3,042,343 | 7/1962 | Cooke | 137—45 X |

FOREIGN PATENTS 1,226,661  2/1960  France.

BENJAMIN HERSH, *Primary Examiner.*

LEO FRIAGLIA, A. HARRY LEVY, *Examiners.*